United States Patent
Deng et al.

[11] Patent Number: 5,739,664
[45] Date of Patent: Apr. 14, 1998

[54] INDUCTION MOTOR DRIVE CONTROLLER

[75] Inventors: Doug Deng; Xingyi Xu, both of Canton, Mich.

[73] Assignee: Ford Global Technologies, Inc., Dearborn, Mich.

[21] Appl. No.: 596,846

[22] Filed: Feb. 5, 1996

[51] Int. Cl.⁶ ............................................. H02P 5/28
[52] U.S. Cl. .................... 318/808; 318/798; 318/815; 318/599; 318/727; 363/40
[58] Field of Search .......................... 318/798–815, 318/599, 727; 363/40, 41

[56] References Cited

U.S. PATENT DOCUMENTS

| | | | |
|---|---|---|---|
| 4,249,120 | 2/1981 | Earle | 318/805 |
| 4,477,763 | 10/1984 | Asano et al. | 318/811 |
| 4,724,373 | 2/1988 | Lipo | 318/805 |
| 4,800,327 | 1/1989 | Fujioka et al. | 318/798 |
| 4,926,104 | 5/1990 | King et al. | 318/599 |
| 5,032,771 | 7/1991 | Kerkman et al. | 318/52 |
| 5,119,007 | 6/1992 | Tunehiro et al. | 318/801 |
| 5,162,709 | 11/1992 | Ohi | 318/811 |
| 5,272,429 | 12/1993 | Lipo et al. | 318/808 |
| 5,298,847 | 3/1994 | Kerkman et al. | 318/800 |
| 5,329,217 | 7/1994 | Kerkman et al. | 318/811 |
| 5,387,855 | 2/1995 | Miyazaki et al. | 318/805 |
| 5,440,219 | 8/1995 | Wilkerson | 318/802 |

*Primary Examiner*—Karen Masih
*Attorney, Agent, or Firm*—Richard D. Dixon; Roger L. May

[57] ABSTRACT

An induction motor control system for electric vehicles having a DC power supply, an inverter, and an induction motor, includes a current control mechanism having a flux controller. The flux controller reduces the stator flux to improve the torque output of a motor at the limit of the voltage supply from the inverter. The reduction in flux is adjustable as the actual limit of voltage available to power the motor varies. A flux reference $\lambda_{so}$ generated according to efficiency control requirements can be adjusted by a flux weakening quantity generated by the controller in the constant power range of operation. The DC bus voltage, the rotor speed and stator flux reference values are input to the flux controller so that the motor can be operated to achieve improved torque output approaching the theoretical maximum torque output or to maximize efficiency as needed. In addition, the flux control influences generation of a stator current that improves the torque output throughout the entire range of motor speed.

14 Claims, 3 Drawing Sheets

INDUCTION MOTOR DRIVE CONTROLLER

TECHNICAL FIELD

The present invention relates to a flux controller in an electric motor drive controller circuit for controlling the operation of an induction motor.

BACKGROUND ART

Induction motor controls are used for electric vehicles including an AC induction motor, an electronic power inverter, and a microprocessor-based controller. The inverter generally includes six switching transistors whose on/off stage will convert a DC current provided by a power supply such as a DC battery into AC current required by the induction motor. The maximum voltage available to the motor is limited by the battery voltage as:

$$V_{smax} = \frac{2}{\pi} VAC$$

(under six step operation) and the maximum current available to the motor is limited by the current carrying capability of the switching devices.

Typically, an induction motor drive provides three stages of operation. At low speeds, the voltage required by the motor is lower than the voltage capability of the inverter. The output torque is limited by the current capability of the inverter, which is independent of the speed. Accordingly, the first stage of operation below a base speed is often called the constant torque stage of operation. At a medium speed range, above the base speed the maximum torque can only be achieved when the motor is operated at both voltage and current limits. In this stage, the maximum output torque is inversely proportional to the speed, hence it is called constant power stage. At high speeds, the voltage capability of the inverter is the primary limiting factor for the output torque, the maximum torque is inversely proportional to the square of the speed. It is referred to as the voltage limit stage.

Due to the complexity of an induction machine, the previously known design considerations failed to achieve the maximum torque over the entire speed range. The previously known flux setting techniques also assumed that the bus voltage is constant at a nominal setting. As a result, a flux control command would be set at a constant when rotor speed is less than base speed ($\omega_r \leq \omega_{ro}$) and inversely proportional to rotor speed $$\left( \lambda^*_r = \frac{\omega_{ro} \lambda}{\omega_r} = V_{smax} \right)$$

when the rotor speed is greater than base speed. However, this method of controlling flux enables torque to approach the maximum torque only in a limited speed range for a selected level of $\lambda_{ro}$.

In addition, the maximum theoretical torque value that can be achieved changes as the actual voltage ($V_{dc}$, $V_{smax}$) level changes, and therefore additional flux changes must be considered to provide a torque level approaching the maximum available torque.

It is also well known that flux setting in an induction machine has a substantial impact upon the efficiency. In applications such as electric vehicles, the flux level is often controlled to achieve optimal efficiency. There may be conflict between flux settings for maximum torque, often needed for demand or load, and a flux setting for optimal efficiency. Accordingly, the previous flux control for efficiency often results in less torque capability. On the other hand, techniques for setting the flux to obtain maximum torque will result in some loss of efficiency.

SUMMARY OF THE INVENTION

The present invention overcomes the above-mentioned difficulties by providing an induction motor control that improves the output torque to approach the maximum theoretical limit throughout the entire speed range of The induction machine speeds by adjusting the flux level. In addition, the flux is adjusted in response to the maximum voltage available to adjust the maximum torque level to be approached preferably as a function of a feedback indication of the maximum available supply voltage. In addition, the present invention enables flexibility to adjust the flux level to achieve efficiency or to approach maximum torque capacity as required by the operator of the induction machine.

Accordingly, whenever the back EMF of the machine is exceeding a value sustainable by the battery voltage, a control algorithm adjusts the flux command to be a lower value so that the back EMF of the machine does not overpass the voltage capability of the inverter. In this way the back EMF is kept the closest to the voltage limit of the inverter, and the voltage capability of the inverter is fully utilized.

The flux level control also includes strategy to adjust the flux as the maximum voltage available and the maximum torque capability changes. Like previous control strategy, adjustments are based on rotating flux orientation control of an induction machine. The rotating reference frame includes d and q axes where the d axis is aligned with the rotor flux $\lambda_r$.

Accordingly, the present invention provides a flux level control with a flux weakening starting point that can be easily set according to the ratio of variation of the DC bus voltage in order to improve utilization of the available DC bus voltage to achieve torque levels approaching the maximum theoretical value. In addition, the flux control provides flux reduction for improving torque output toward the maximum theoretical torque limit through the entire speed range of the induction machine. An automatic transition between a pulse width modulated (PWM) and a six step modulation (SSM), as well as maximum torque or maximum efficiency strategies, for example, operation according to load condition is provided. In addition, the control is defined in terms of stator flux $\lambda_s$ and stator $L_s$ which can be more readily and accurately obtained from testing than $\lambda_r$ or $L_m$. In addition, the flux control scheme is conveniently adapted to incorporate other control functions such as flux regulation loop, response to supply voltage changes and efficiency control.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
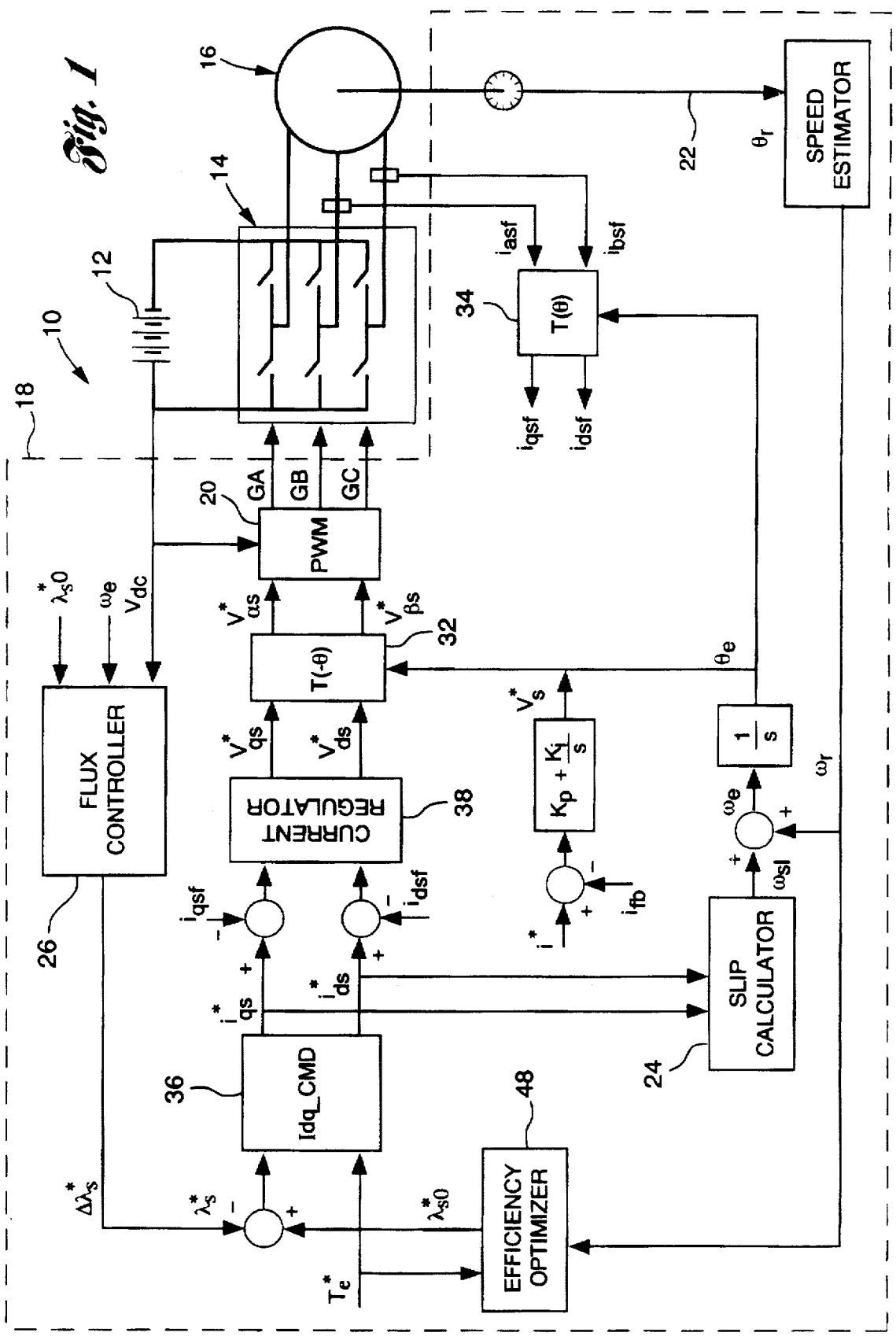
FIG. 1 is a block diagram of an induction motor drive controller for an electric vehicle constructed according to the present invention.
Figure 2:
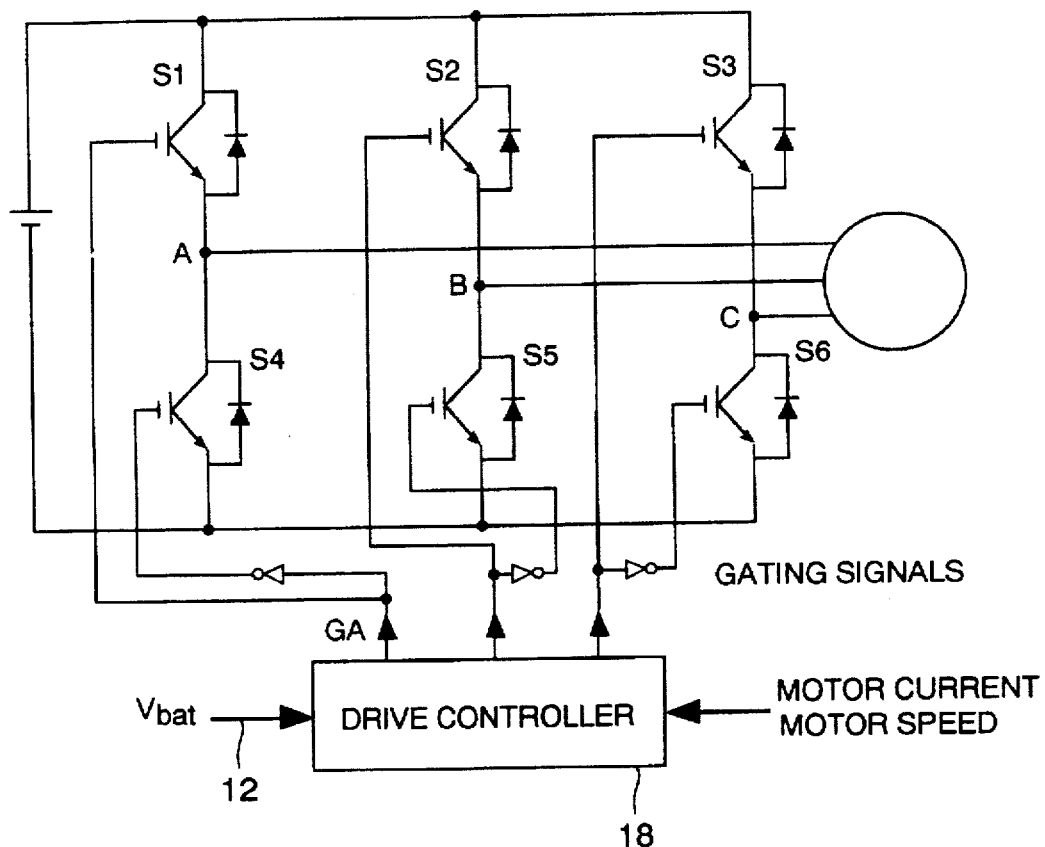
FIG. 2 is a schematic representation of the inverter construction shown more diagrammatically in FIG. 1.

Referring first to FIG. 1, an electric vehicle drive system 10 includes a power supply in the form of a vehicle battery 12 applied by an inverter 14 to an induction motor 16. In addition, a drive controller 18 that controls the voltage and current applied to the motor 16 which, in turn, drives the wheels of the vehicle throughout the range of operating conditions. Preferably, the controls in the controller 18 rely upon software. However, it will be understood that hardware and other types of controls can be used to practice the present invention.

The controller 18 utilizes current regulation realized in a synchronous frame rotating with the rotor flux frame. Two current components are controlled including the torque component current, also referred to as the q axis current $i_q$, and the magnetizing current, also referred to as the d axis current $i_d$. Two independent controllers are used to regulate the two current components. PI regulation algorithm is adopted in the two controllers. Two output variables from the two controllers are the torque component voltage command ($V^*_{qs}$) and the magnetizing component voltage command ($V^*_{ds}$). These commands are transformed to $V^*_{\alpha s}$ and $V^*_{\beta s}$ and used as input variables in the algorithm of the pulse width modulation section 20.

In two blocks of transformation calculation, one calculation block 34 is used to transform phase currents on the stator frame ($i_a$, $i_b$) to $i_d$, $i_q$ currents on a synchronous frame. The other block 32 is used to transfer ($V_d$, $V_q$) voltages on the synchronous frame to phase voltages ($V_\alpha$, $V_\beta$) on the stator frame. The rotation angle involved in the two transformation blocks 34 and 32 equals the rotor flux rotation angle and provide control over the rotor flux orientation.

Indirect rotor flux orientation (RFO) control is used. Such orientation calculates the rotor rotation angle $\theta_r$ and rotor rotation frequency $\omega_r$ from machine shaft encoder information as shown at 22. Indirect RFO control theory is used to calculate slip frequency $\omega_{SLP}$ and slip rotation $\theta_{SLP}$. As a result, $\theta_r$ and $\theta_{SLP}$ can be added to obtain a stator flux rotation angle $\theta_e$, or equivalently $\omega_{SLP}$ can be added to $\omega_r$ to generate $\omega_e$, and then integrating $\omega_e$ to generate $\theta_e$, as shown at 24.

In a first stage of operation, the controller 18 preferably provides space vector pulse width modulation (SVPWM) and a smooth transition from SVPWM to six step modulation (SSM) by control 20. This achieves better utilization of the bus voltage than systems where the SVPWM switching sequence transitions into a pulse dropping transition mode between a linear pulse width modulation mode and the six step mode. In order to prevent "shoot-through" of an inverter leg, the transistor turning off has to be turned off before the on-going transistor can be turned on. A dead-time circuit is commonly used to delay the turn-on without affecting the turn-off. To compensate for voltage error, the gating signals are altered.

Field orientation control as used in induction machines is similar to separately excited DC motors stators and rotors except that there is no separate winding for flux current and no terminals are available to detect the rotor currents. Accordingly, coordinate control of the magnitude, frequency and phases of stator current is used to realize separate flux and torque control of the induction motor 16. Accordingly, torque control in terms of the stator current is defined by $T_e = k \bar{i}_s \times \bar{\lambda}_s$. Accordingly, where the magnitude of rotor flux | $\bar{\lambda}_r| = L_m I_d$, $T_e = k|\bar{\lambda}_r| \, |I_s| \cdot \sin \alpha(\lambda_r, I_s) = K|\bar{\lambda}_r| I_q = k' \, L_m \, I_{ds} \, I_{qs}$.

In the preferred embodiment, a flux reference $\lambda_{so}^*$ is also generated according to efficiency control 48 requirements based on an experimentally determined efficiency map for the drive. The efficiency map is dependent upon the design of the motor 16. Nevertheless, the control is changed to meet efficiency or maximum torque capability as needed as discussed in detail below.

In the preferred embodiment, the induction machine drive with a wide speed range usually works at a constant torque mode below a base speed $\omega_{ro}$ as shown at 44 in FIG. 3 and at a constant power mode above the base speed as shown at 46 in FIG. 3. The flux level in the machine is set to be rated value $\lambda_{so}$ below the base speed because the back EMF $E_q$ of the machine is much lower than an output voltage limit of the inverter in the drive. As speed increases, the flux will be reduced to keep the back EMF $E_q$ of the machine lower than the limited output voltage of the inverter. Accordingly, a flux control 26 including an algorithm adjusts the flux reference to be a lower value so that the back EMF of the machine does not overpass the available voltage $V_{smax}$. If the back EMF closes to the voltage limit of the inverter, the voltage capability of the inverter is better utilized to improve torque output.

The flux level control strategy is based on the steady-state equations of a rotor flux orientation induction machine:

$$V_{qs} = R_s I_{qs} + \omega_e \left( \frac{L_m}{L_r} \lambda_{dr} + \sigma L_s I_{ds} \right) = R_s I_{qs} + \omega_e \lambda_s$$

Figure 4:
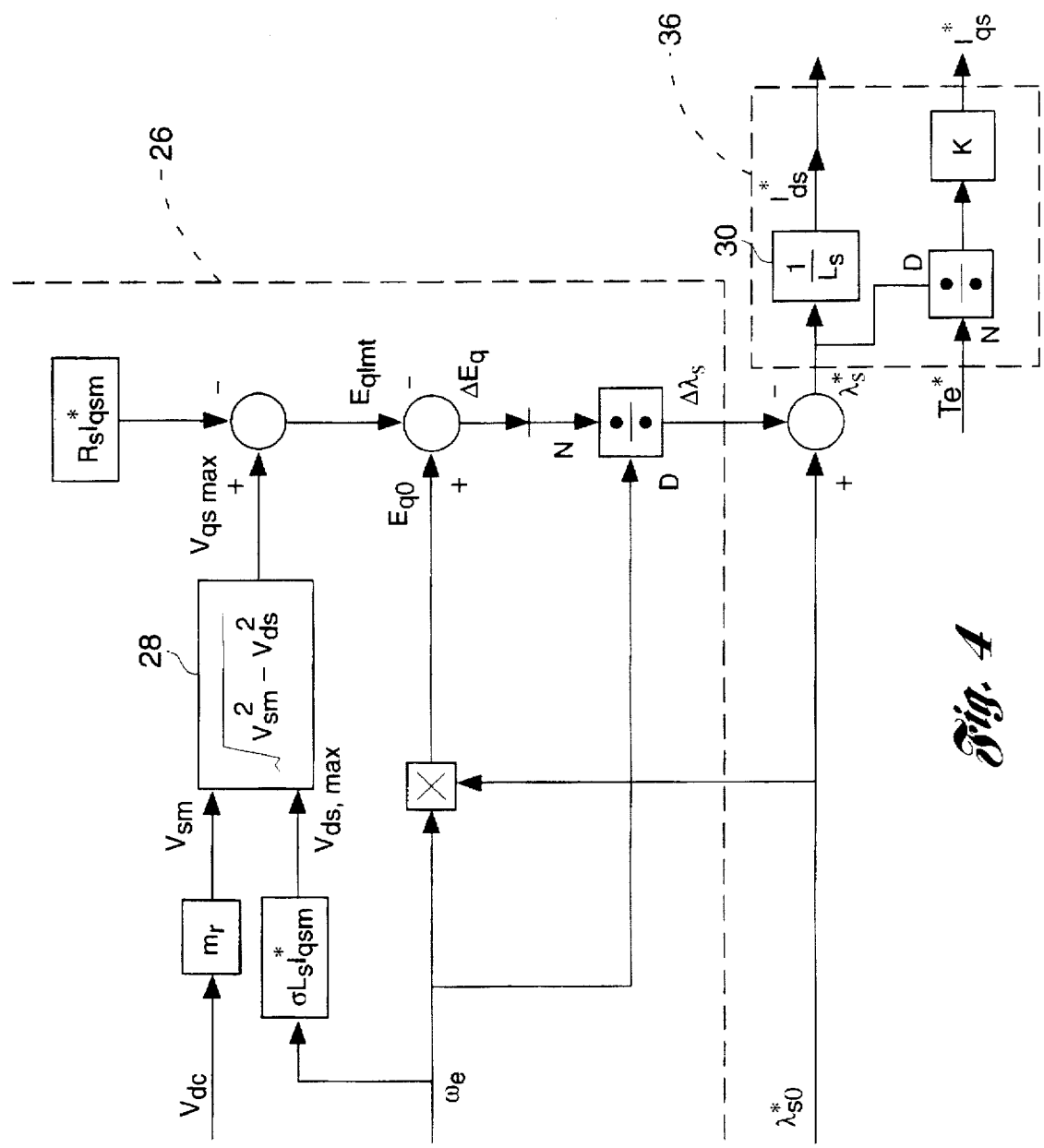
FIG. 4 is a block diagram of a flux controller shown in FIG. 1.

Referring now to FIG. 4, the voltage level $V_{dc}$ is input to the flux controller and factored by the modulation ratio $m_r$ to represent a control influence that is a function of the maximum stator voltage $V_{sm}$ available from the inverter. The modulation ratio is usually set to be 0.577 for CRPWM operation and 0.637 for space vector pulse width modulation to a six step modulation operation stage. In this algorithm, the bus voltage $V_{dc}$ is sensed and used to set the limit on the maximum voltage available from the inverter, $V_{sm}$. The scaling constant $m_r$ can be chosen so that the inverter can operate in the six step mode. The back EMF limit, $E_{qlmt}$ is then derived from $V_{sm}$. An estimated back EMF, $E_{q0}$ is compared with $E_{qlmt}$. The flux setting of the motor is reduced so that $E_{q0}$ matches with $E_{qlmt}$. In this way, the motor can be operated at both voltage and current limit of the inverter and achieves maximum output torque and full utilization of the inverter.

$m_r \cdot V_{dc}$ is the maximum operation stator voltage limit ($V_{smax}$). This term is used together with a maximum magnetizing voltage $V_{ds,max}$ derived from the stator frequency and the stator inductance and stator torque component command current $I_{qs,max}$ at 28 to develop a maximum torque voltage $V_{qs,max}$. The difference between the maximum torque component $V_{qs}$ voltage and the torque component command $I_{qs}^* R_s$ of the stator provide a torque component voltage limit $E_{qlmt}$. The difference between the back EMF limit $E_{qlmt}$ and the rated torque component of voltage $E_{qo}$ derived from the stator frequency $\omega_e$ and the rated stator flux $\lambda_{so}^*$ produce a control for reduction in flux $\lambda_r$ if improved torque rather than maximum efficiency is required.

The torque component change $\Delta E_q$ required is then divided by the stator frequency $\omega_e$ to provide a change of stator flux $\Delta \lambda_s$ that must be added to the stator flux command $\lambda_{so}^*$ to provide a stator command $\lambda_s^*$. The flux command $\lambda_s^*$ is then transformed at 30, preferably with a look-up table with saturation effect recorded, that provides a magnetizing current component command $I_{ds}^*$. The flux command $I_{ds}^*$ that provides the magnetizing component command of the current command generator 36 is also influenced by the torque command $T_e^*$ to develop torque current command $i_{qs}^*$ and magnetizing current command $i_{ds}^*$ for introduction into the current regulator 38.

Figure 3:
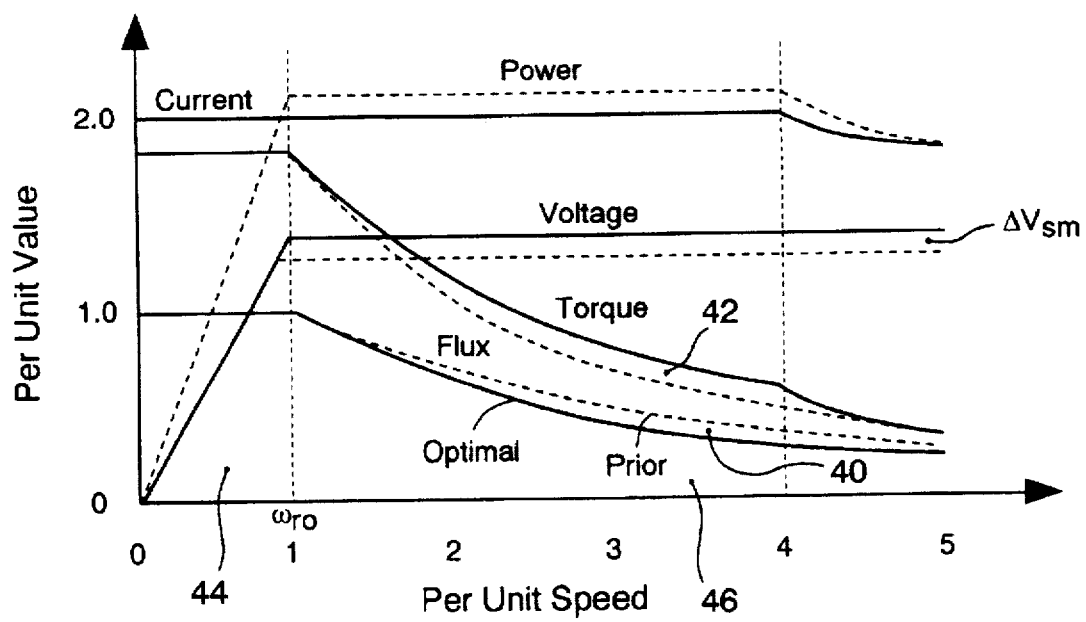
FIG. 3 is a graphic representation of performance improvement in accordance with the present invention.

As a result, FIG. 3 demonstrates that a torque can be maximized as the stator flux is reduced at higher rotor frequencies as shown at 40 in order to take better advantage of the full current and voltage operation stage. Accordingly, the torque output limit improves as shown at 42 in FIG. 3.

Having thus described the present invention, many modifications thereto will become apparent to those skilled in the art to which it pertains without departing from the scope and spirit of the present invention as defined by the appended claims.

What is claimed is:

1. A method for improving torque output of an induction motor at high motor speeds when maximum drive voltage and drive current are applied to the motor, comprising generating a stator flux adjustment signal in response to the feedback of a power supply voltage limit available when said maximum drive voltage and said maximum drive current are delivered at an operating limit, said flux adjustment signal reducing a flux current command to maximize torque at said operating limit.

2. The method as defined in claim 1 wherein said generating step comprises:

comparing a back EMF limit derived from the voltage supply limit with a voltage determined by the rated flux and the rotor frequency.

3. The method as defined in claim 1 and further comprising converting said stator flux adjustment signal to a magnetizing current command signal.

4. A flux control logic for an invertor drive controller containing a current command generator for an induction machine, the logic comprises:

a power supply voltage sensor feedback for identifying an available voltage limit coupled to the controller, an excitation frequency input, a nominal stator flux command, a back EMF limit derived from the voltage limit of said feedback voltage sensor, and a subtractor for determining a difference between the back EMF limit and a product of the nominal stator flux command and the excitation frequency input, wherein said current command generator receives an adjusted flux command in response to said difference.

5. The control logic as defined in claim 4 wherein said current command generator comprises a developer for generating a torque control current command from said difference.

6. The control logic as defined in claim 4 wherein said current command generator divides said adjusted flux command by a stator inductance to generate a magnetizing current command.

7. The invention as defined in claim 4 wherein said logic comprises dividing said difference by said excitation frequency command to generate a flux change signal.

8. The invention as defined in claim 7 wherein said flux change signal is subtracted from the rated stator flux command to generate said adjusted flux command.

9. The invention as defined in claim 5 wherein said developer divides a torque command by said adjusted flux command to generate a torque control current command.

10. An electrical vehicle traction drive control comprising:

an induction motor, a battery power supply, an invertor for driving said induction motor from said power supply, including a pulse-width modulation control, an invertor control including a current regulator, a current command generator for controlling stator current delivered by said regulator in response to a torque demand, a rotor speed estimator having a rotor movement output and an efficiency optimizer providing a stator flux reference command signal in response to said rotor movement output and said torque demand and further comprising a flux controller responsive to a feedback of supply voltage limit, said rotor movement output and said stator flux reference command signal to generate a flux change command signal,wherein said flux change command signal offsets said stator flux reference command signal in response to a difference between back EMF and a limit value EMF obtained as a function of said feedback of supply voltage.

11. The control as defined in claim 10 wherein said flux change command signal is said difference divided by said rotor movement output.

12. The invention as defined in claim 11 wherein a second difference between said flux change command signal and said stator flux reference command signal is introduced to said current command generator.

13. The invention as defined in claim 12 wherein said current command generator generates a flux control current command.

14. The invention as defined in claim 12 wherein said current command generator generates a torque control current command.

* * * * *